US006925415B2

(12) United States Patent
Tseng et al.

(10) Patent No.: US 6,925,415 B2
(45) Date of Patent: Aug. 2, 2005

(54) METHOD AND SYSTEM FOR MEASURING CHARACTERISTICS OF LIQUID CRYSTAL DISPLAY DRIVER CHIPS

(75) Inventors: I-Shih Tseng, Tao-Yuan Hsien (TW); Chau-Chin Su, Taipei (TW); Wei-Juo Wang, Pei-Te (TW)

(73) Assignee: Chroma Ate Inc., Taipei Hsien (TW)

( * ) Notice: Subject to any disclaimer, the term of this patent is extended or adjusted under 35 U.S.C. 154(b) by 0 days.

(21) Appl. No.: 10/374,441

(22) Filed: Feb. 25, 2003

(65) Prior Publication Data

US 2003/0171883 A1 Sep. 11, 2003

(30) Foreign Application Priority Data

Mar. 5, 2002 (TW) .......................................... 91103980 A

(51) Int. Cl.[7] .......................... G06F 17/18; G06F 15/00

(52) U.S. Cl. ........................ 702/181; 702/191; 702/194

(58) Field of Search .......................... 702/64, 181, 189, 702/179, 190, 191, 194; 324/158.1, 754, 755, 765

(56) References Cited

U.S. PATENT DOCUMENTS

H1458 H * 7/1995 Slack ...................... 324/76.13

* cited by examiner

*Primary Examiner*—John Barlow
*Assistant Examiner*—Meagan S Walling
(74) *Attorney, Agent, or Firm*—Ladas & Parry LLP

(57) ABSTRACT

A measuring method and system for liquid crystal display driver chips applies a new method to measure voltages of driver chips, and utilizes probability and statistics for analysis and determination so as to yield a rather accurate effect even under noisy environments. Accordingly, analog-to-digital converters can be replaced for faster sampling. The measuring method and system can be implemented using comparator circuits or pin electronics cards so that the measuring procedure for driver chips is simplified. Measured results are analyzed and verified by application of probability and statistics. As such, testing of liquid crystal display driver chips is more accurate, testing time is reduced, and accuracy level is promoted.

7 Claims, 8 Drawing Sheets

| | IEEE 1057 TEST STANDARD | OUR RESULT |
|---|---|---|
| RECORD LENGTH (SAMPLES) | PRECISION (% OF RMS NOISE) | PRECISION (% OF RMS NOISE) |
| 64 | 45% | 37.6% |
| 256 | 23% | 7.2% |
| 1024 | 12% | 5.9% |
| 4096 | 6% | 3.9% |

FIG.11

METHOD AND SYSTEM FOR MEASURING CHARACTERISTICS OF LIQUID CRYSTAL DISPLAY DRIVER CHIPS

CROSS-REFERENCE TO RELATED APPLICATION

This application claims priority of Taiwanese application no. 091103980, filed on Mar. 5, 2002.

BACKGROUND OF THE INVENTION

1. Field of the Invention

The invention relates to a measuring method and system, more particularly to a method and system for testing liquid crystal display driver chips that utilize probability and statistics in the analysis of the accuracy of measured values and that can be realized using pin electronics (PE) cards or comparators.

2. Description of the Related Art

Due to increasing market demand of communications systems, multi-media and computer peripherals, liquid crystal displays are continuously replacing conventional Cathode Ray Tube (CRT) monitors. As a result, the demand for liquid crystal display driver chips is also increasing at a rapid pace. In the known driver chips, several hundred drive pins are integrated into a single chip to promote overall efficiency as well as to reduce chip area and costs. To test chips with a high pin count, faster and more complicated testing machines are required to meet test specifications. However, fast and highly accurate testing machines for driver chips are very expensive. Moreover, the large number of pins in a chip results in difficulty in measuring internal voltages. Therefore, the design of an economical, effective and accurate way of testing liquid crystal display driver chips is a very tough challenge.

Testing of liquid crystal display driver chips is similar to that for voltage levels. How voltages of internal nodes can be measured for debugging is a very important step. In general, higher accuracy is usually achieved by over-sampling during voltage measurements or, in the alternative, by applying relatively slow analog-to-digital (A/D) converters with noise-suppressing effects, such as Dual Slope ADC or Sigma Delta ADC, so as to meet the accuracy requirement. As such, trade-off must be made between measurement accuracy and testing time, where demand for accuracy often takes precedence over limitations of testing time. As a result, the testing time is often extended, thereby resulting in higher testing costs.

SUMMARY OF THE INVENTION

Therefore, the main object of the present invention is to provide a method and system for measuring characteristics of liquid crystal display driver chips, wherein, through application of probability and statistics and over-sampling, a reliable signal voltage level can be analyzed and obtained even under noisy environments.

Another object of the present invention is to provide a method and system for measuring characteristics of liquid crystal display driver chips, wherein accuracy comparable to the IEEE1057 testing standard can be achieved using a fewer number of sampling points so as to save testing time and reduce testing costs.

A further object of the present invention is to provide a method and system for measuring characteristics of liquid crystal display driver chips that permit the manufacture of complicated yet speedy testing instruments to satisfy ever-stringent testing specifications so as to solve the aforesaid drawback of waste of chip testing time.

According to the present invention, the method and system for measuring characteristics of liquid crystal display driver chips involve the use of pin electronics (PE) cards or comparators instead of analog-to-digital converters for voltage measurement. Accordingly, fast sampling can be conducted, and by applying probability and statistics in the analysis of the accuracy of measured values, highly reliable results can be obtained even under noisy environments. The main framework of the measuring system includes three parts: the first part being a Device Under Test (DUT), which could either be a digital-to-analog converter or any voltage to be tested; the second part being a stable reference voltage source generated by digital-to-analog converters and control circuits; and the third part being a measuring unit. The measuring unit has a noise distribution, outputs at least a signal, and calculates and determines area distribution of the signal. The measuring unit generates voltage falling point probability curves from different signal distributions, and obtains voltages values by repeated sampling of the probability curves through interpolation. Finally, correct tested voltage values are computed by weighted averaging calculation of the aforesaid voltage values.

BRIEF DESCRIPTION OF THE DRAWINGS

Other features and advantages of the present invention will become apparent in the following detailed description of the preferred embodiments with reference to the accompanying drawings, of which:

FIG. 11 is a table to illustrate comparison between the present invention and the IEEE1057 testing standard.

DETAILED DESCRIPTION OF THE PREFERRED EMBODIMENTS

Figure 1:
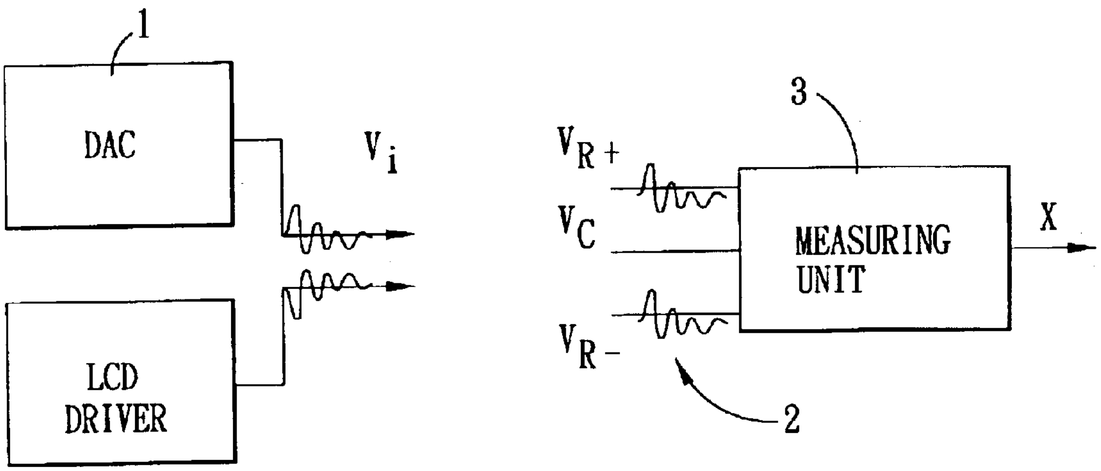
FIG. 1 is a block diagram showing an embodiment of a measuring system for testing liquid crystal display driver chips according to the present invention.

As shown in FIG. 1, the system of the present invention includes a Device Under Test 1, a reference voltage source 2 and a measuring unit 3. The test source can be the output of a digital-to-analog converter (DAC) or any voltage (Vx) to be tested, and is connected to the measuring unit 3. When a signal is inputted to the measuring unit 3, $V_{R+}$ and $V_{R-}$ are reference voltages 2, Vc is the midpoint voltage of the aforesaid voltages, and ΔVR is the difference between the two reference voltages. After analysis by the measuring unit 3, a value (X) will be outputted, from which the actual Vx value of the signal can be determined. While the underlying principle of the system of the present invention is based under ideal conditions, however, in a real environment, noise has a very serious affect on the system. Accordingly, it is assumed in the present invention that signals and reference voltages will be affected by noise, which has a Gaussian distribution.

Figure 2:
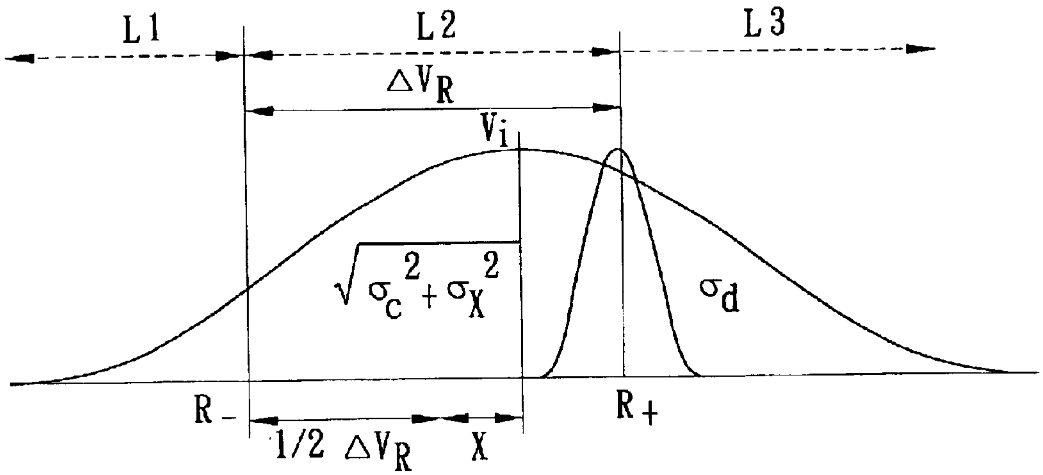
FIG. 2 is a graph of noise distribution of a measuring unit of the measuring system.

FIG. 2 illustrates noise distribution of the measuring unit 3. Through this framework, signal distribution probability can be inferred and obtained. As shown in the Figure, $V_{R+}$indicates a higher reference voltage, and $V_{R-}$indicates a lower reference voltage. Both commonly have a noise source with a standard deviation $\sigma_c$. The magnitude of their noise is $\sigma_d$. The magnitude of the noise in the signal to be tested is $\sigma_x$. X is the average midpoint distance of the signal. To simplify analysis and calculations, $\sigma_c$ can be merged into the signal such that the signal noise becomes $\sqrt{\sigma_x^2+\sigma_c^2}$. Moreover, the signal positions are sub-divided into three areas: L1, L2 and L3. By double integration of the Gaussian probability density function, probabilities for the areas can be obtained as $P_{L1}$, $P_{L2}$, and $P_{L3}$, respectively.

Figure 3:
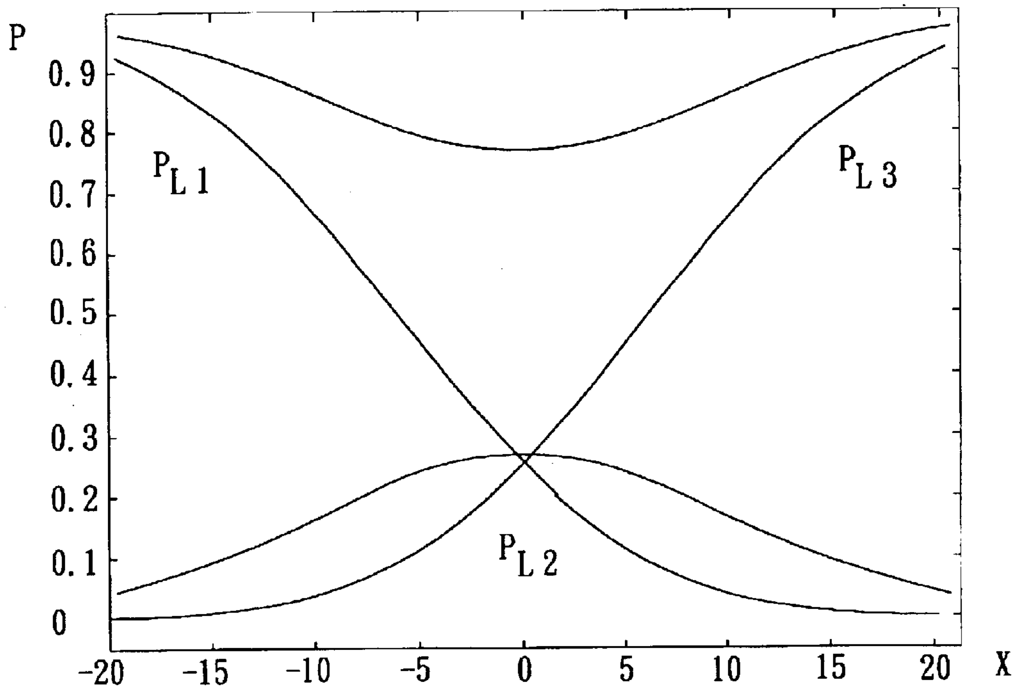
FIG. 3 is a graph of probability curve distribution of the measuring system.

Based on the foregoing calculation and analysis, three probability curves are obtained, as best shown in FIG. 3. For instance, $P_{L3}$ indicates that the probability of the value of the signal to be tested as falling in the area L3 is a curve that varies with the output value X of the measuring unit 3. As the signal becomes bigger than Vc, the value of $P_{L3}$ increases accordingly. The same principle is applicable to $P_{L1}$ and $P_{L2}$.

It is well known that measuring accuracy is closely related to the number of sampling points. Confidence relates to the high probability of the correct tested value as falling within the range of a predicted area, and accordingly, is an indication of the reliability of a measured result. The measuring method of the present invention applies a triple standard deviation, that is, 99.7%, for calculations. For example, assuming that the probability for a signal to fall within the area L2 is P, there are two possibilities: the signal is present or absent in that specific area L2. Random variables can be determined according to the Bernoulli distribution function, as shown in [1]. On the other hand, according to the central-limit theorem, any function will approximate a Gaussian distribution when there are many sampling points. Therefore, confidence area and standard deviation can be obtained, as shown in [2].

$$\sigma^2=p*(1-P) \qquad [1]$$

$$C=3*(\sqrt{p}*(1-p)/\sqrt{\text{Sample}}) \qquad [2]$$

Figure 4:
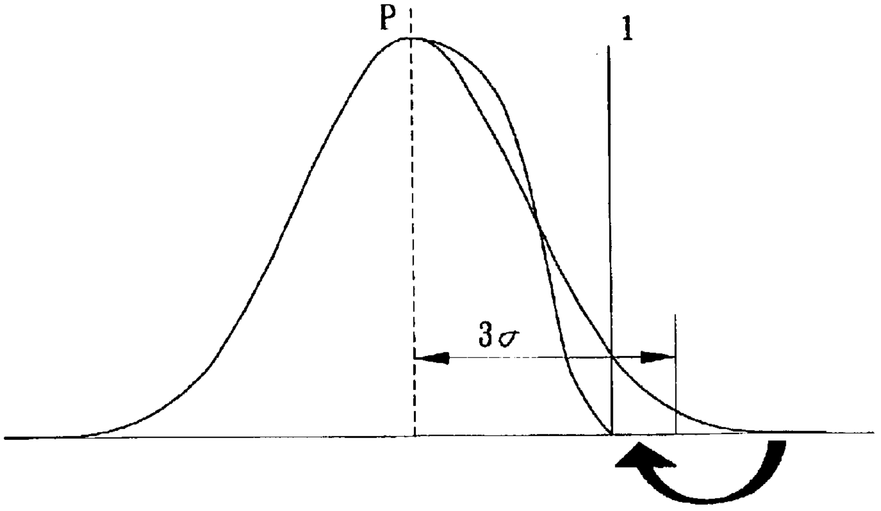
FIG. 4 illustrates a probability curve before correction.
Figure 5:
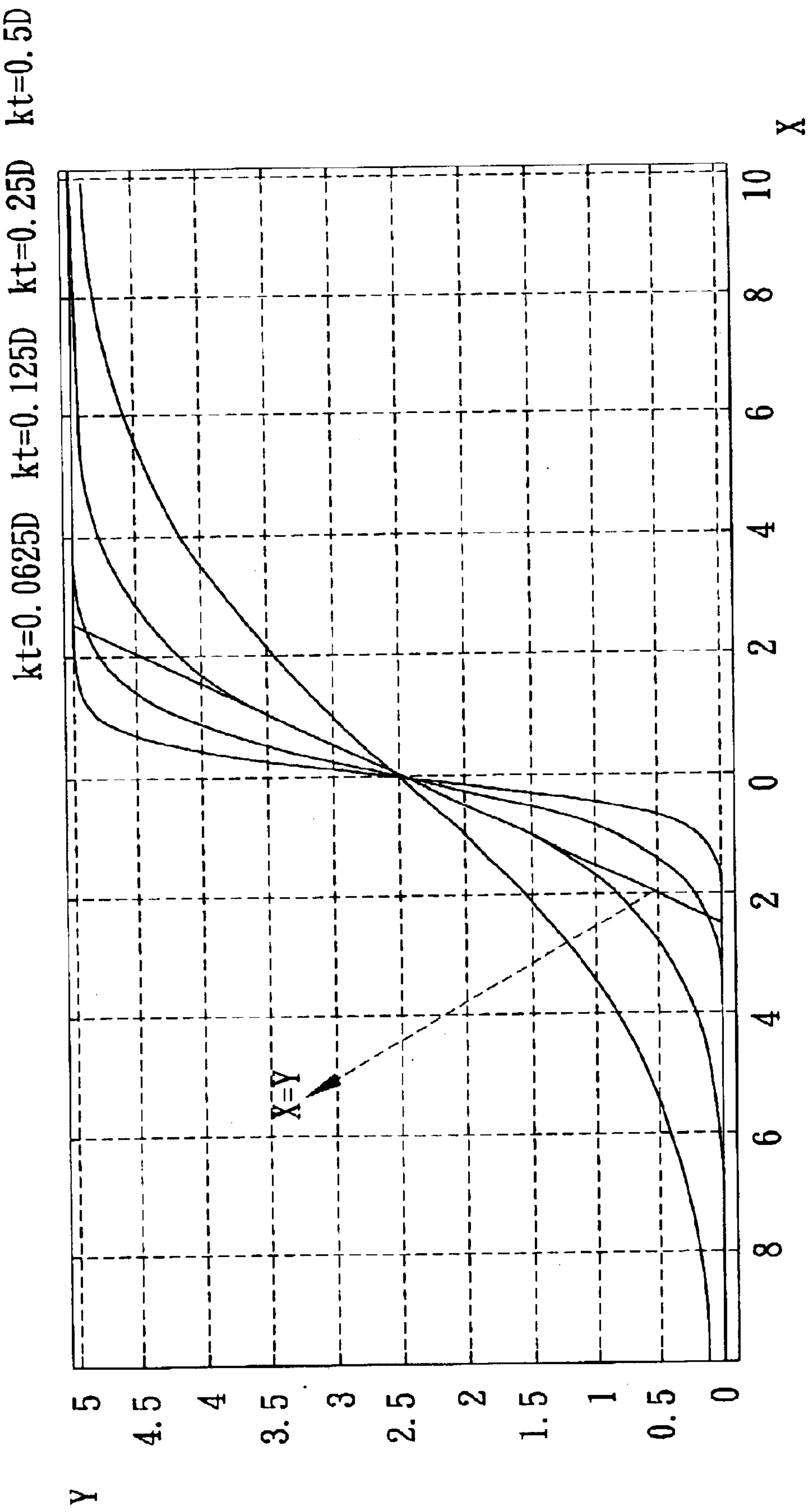
FIG. 5 illustrates a distribution function of a Fermi Dirac function.

After the confidence area is obtained, it can be said that the tested signal has some confidence of not falling out of the calculated scope. Under this restriction, the number of sampling points needed to meet different requirements can be estimated so that verification of accuracy of calculated results can be simulated. Nevertheless, unreasonable parts were found since probabilities greater than 1 or smaller than 0 are present in boundary portions, as shown in FIG. 4. The cause is a result of direct addition or subtraction of 3σ without taking into account probability boundary effect when calculating confidence. A converging method is thus needed.

Figure 6:
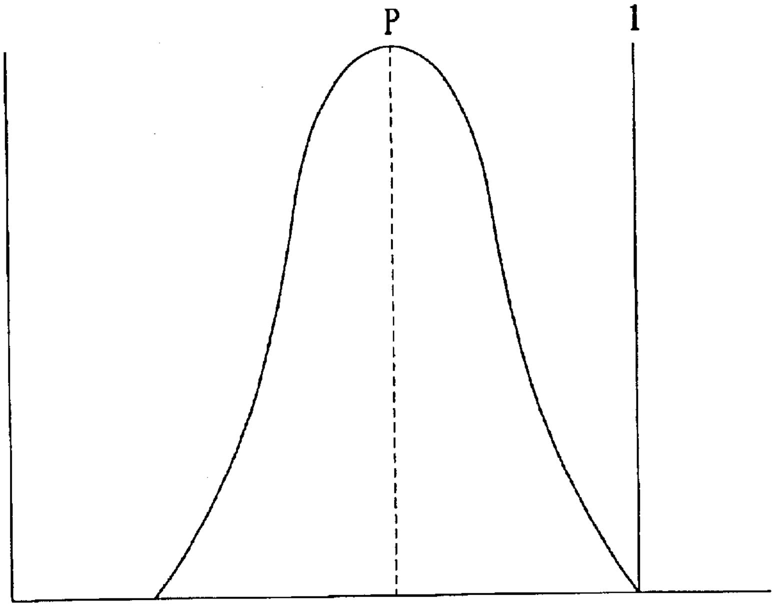
FIG. 6 illustrates a probability curve after conversion.

In the measuring method of this invention, the Fermi Dirac function derived from solid-state electronics is applied to approximate boundary probability, wherein convergence occurs only when X is very big or very small. The intermediate portion will appear almost the same as the original curve, as shown in FIG. 6, thereby resulting in a probability distribution function that is non-Gaussian, yet close to Gaussian so as to reasonably exist in nature.

Figure 7:
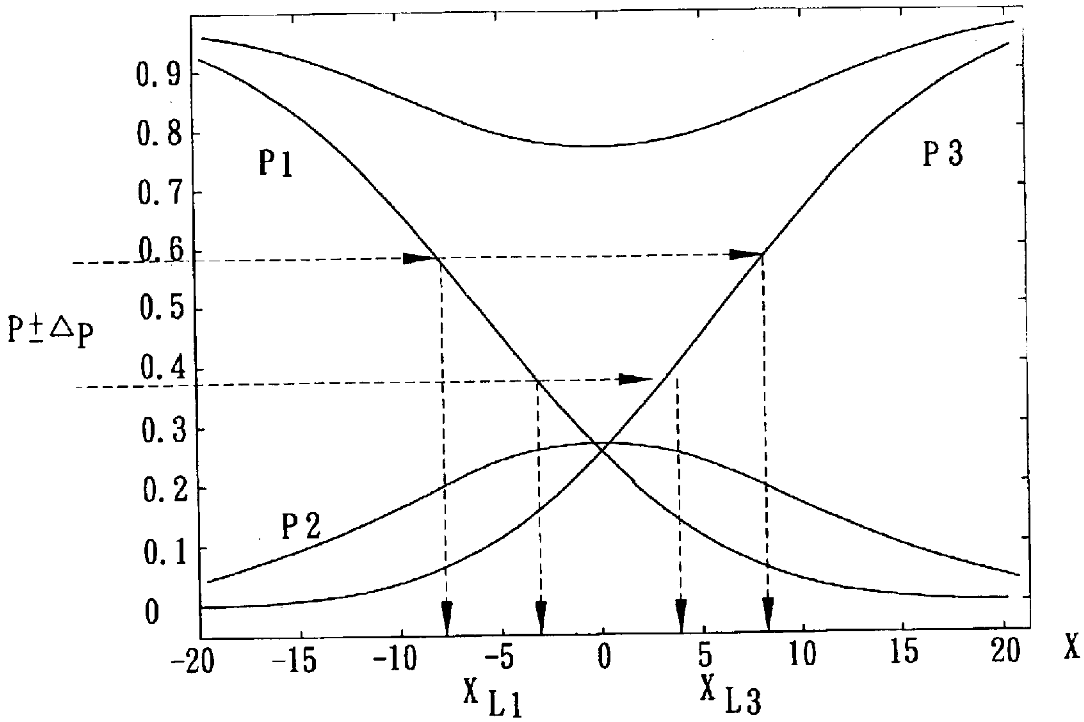
FIG. 7 illustrates how voltage values are obtained from probability curves.

The main purpose of the measuring method of the present invention is to acquire accurate voltage values. After three probability curves are obtained according to the aforesaid methods, interpolation is applied to obtain voltage values. As shown in FIG. 7, measured values with triple standard deviation can be obtained through a look-up table. It is evident that $X_{L3}$ and $X_{L1}$ can be obtained from correspondence of P±ΔP to the curves. When the number of samples becomes larger, the interval of $X_{L3}$ becomes smaller, which indicates higher accuracy. Finally, after $X_{L1}$, $X_{L2}$ and $X_{L3}$ are obtained, the voltage value to be tested can be derived by weighted averaging.

Figure 8:
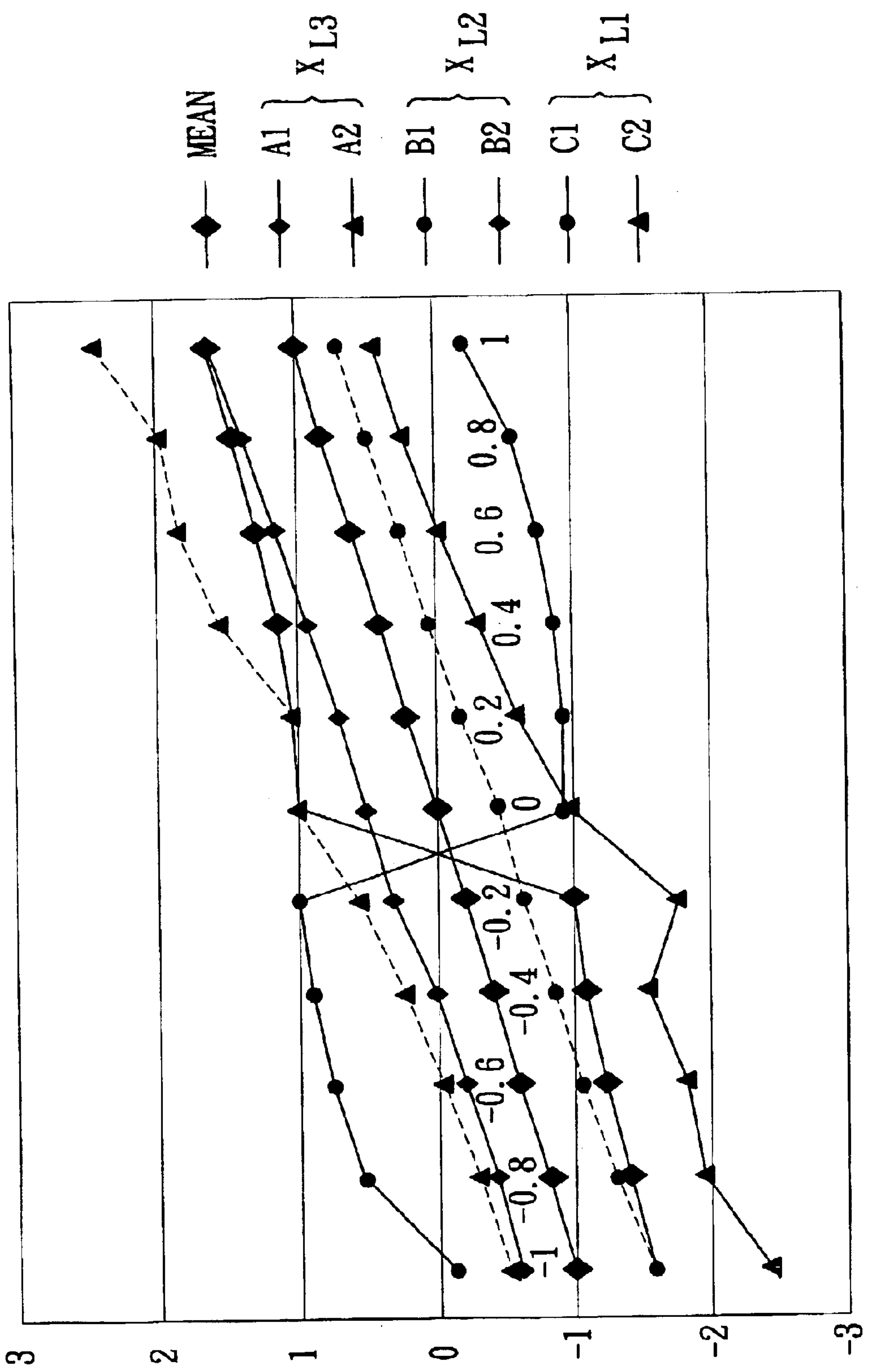
FIG. 8 is a graph showing verification results upon verifying test results.

In the present invention, to verify accuracy of the measuring process flow and results, random noises were introduced into the system, and the results are shown in FIG. 8. The fact that the three predicted areas contained correct signal values proves that the measuring method can accurately measure a voltage to be tested.

The testing method of the present invention can be implemented using comparator circuits or pin electronics (PE) cards to achieve the aforesaid effects.

Figure 9:
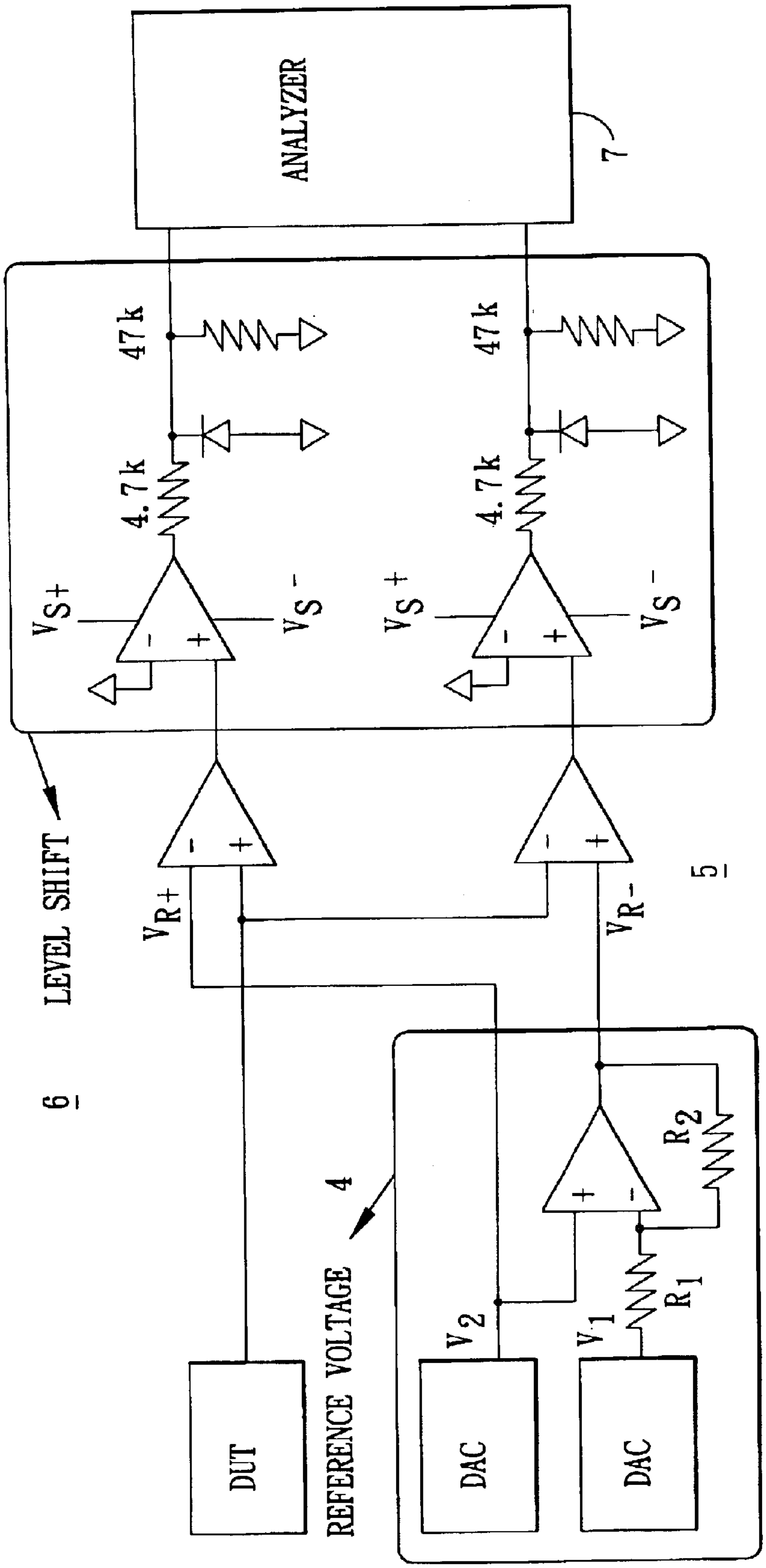
FIG. 9 is a circuit diagram of the measuring system when implemented as a comparator circuit.

As shown in FIG. 9, a measuring system built from comparator circuits includes a reference voltage source 4, comparators 5, a level shift circuit 6, and an analyzer 7. The reference voltage source 4 is generated by digital-to-analog converters, controls output levels through digital codes, and generates a very small Δ $V_R$ by fine tuning R1/R2. The comparators 5 are the most principal part of the measuring unit. When a signal to be tested is inputted into this stage, two irregular signals will be outputted after comparison and will be subsequently sent to the analyzer 7 for analysis. Preferably, the input signal is 1 MHz, and the sampling signal is 10.3 Mhz.

Figure 10:
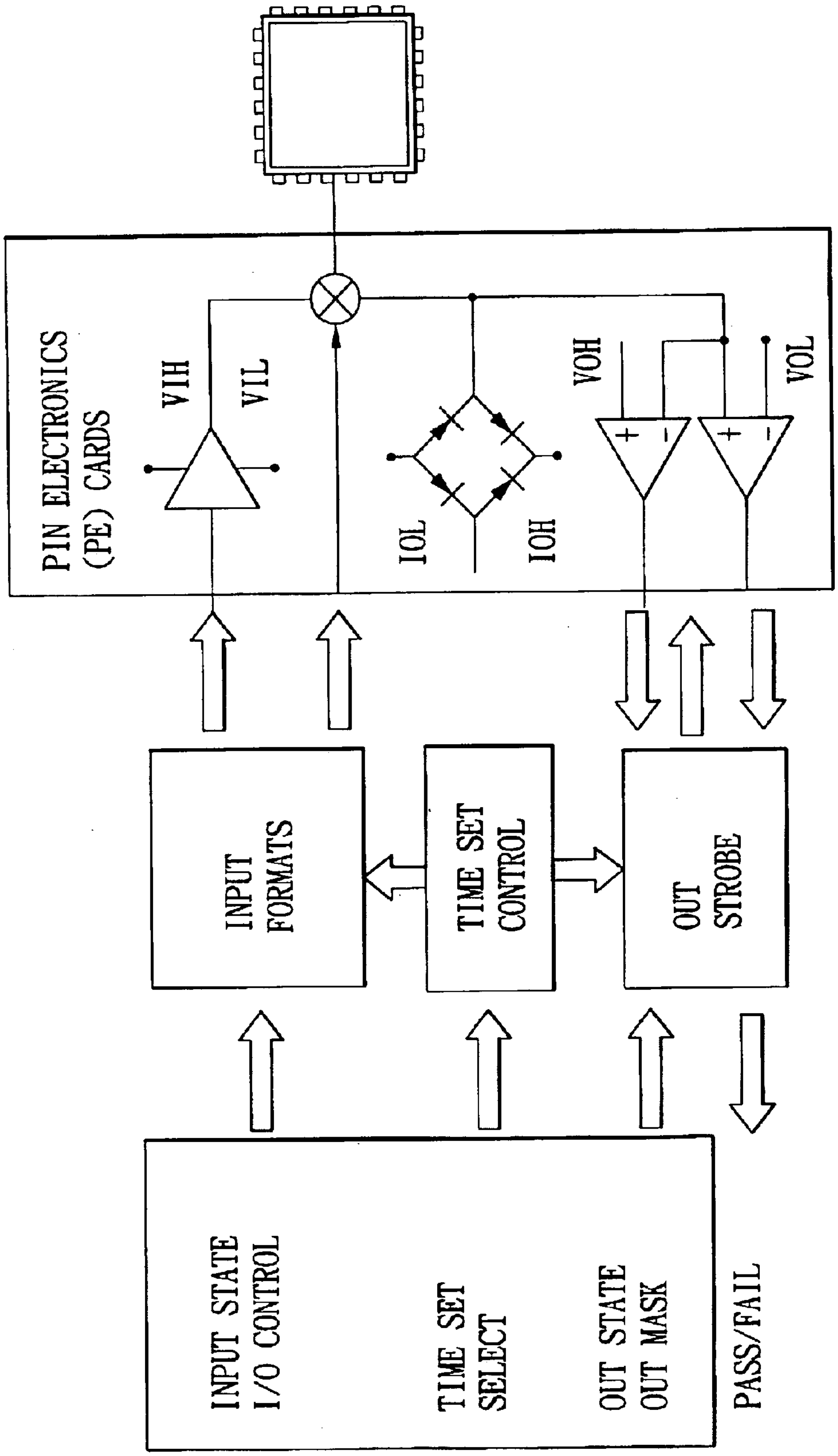
FIG. 10 is a block diagram of the measuring system when implemented as a PE card.

Referring to FIG. 10, the use of PE cards to realize testing is very convenient. Since the PE card incorporates comparators, it is quite practical for use in the present testing method as it only requires setting of driver and load circuits to high impedance.

The measuring method and system of the present invention has the following characteristics:

1. As expected, an increase in the number of samples when the measuring method of the present invention is applied will accordingly increase the associated accuracy (as shown in FIG. 11). When compared with the IEEE1057 testing standard, higher accuracy can be achieved. In other words, the same accuracy is possible with a fewer number of samples when the present measuring method is applied, thereby resulting in a shorter testing time.

2. The measuring method of the present invention was further verified using MATHLAB simulation and real hardware field testing, which confirmed accurate measured results of voltages to be tested. The accuracy, inventive step and industrial applicability are thus firmly founded.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method of measuring characteristics of liquid crystal display driver chips, comprising:

through a measuring unit of a system, outputting at least a value, from which an actual value of a signal can be determined;

based on noise distribution of the measuring unit, distributing signal positions among different areas;

double-integrating density of each area to obtain a probability curve for each area;

obtaining voltage values by repeated sampling of the probability curves through interpolation; and computing correct tested voltage values by weighted averaging calculation of the voltage values.

2. The method of claim 1, wherein an input end of the measuring unit further includes a device under test and a stable voltage source.

3. The method of claim 1, wherein the probability of the value of the voltage to be tested as falling in each area varies in accordance with the output value of the measuring unit.

4. The method of claim 1, wherein the number of sampling points is proportional to the measuring accuracy and confidence level.

5. The method of claim 1, wherein predicted voltage ranges of the probability curves include the voltage value to be measured.

6. The method of claim 1, wherein accuracy of voltage measurement comparable to or higher than that of the IEEE1057 test standard can be achieved with a smaller number of sampling points.

7. The method of claim 1, wherein accuracy is defined as the difference between measured result and simulated result divided by the root mean square of noise.

* * * * *